United States Patent [19]

Sallé et al.

[11] 4,420,832

[45] Dec. 13, 1983

[54] CONCENTRATOR-DECONCENTRATOR DEVICES

[75] Inventors: Jacques E. Sallé; Jean A. M. Jossif; Gilbert J. M. Rathier; Jean-Pierre Vales, all of Colombes, France

[73] Assignee: Le Materiel Telephonique Thomson-CSF, Paris, France

[21] Appl. No.: 141,904

[22] Filed: Apr. 21, 1980

[30] Foreign Application Priority Data

Apr. 25, 1979 [FR] France ............................... 79 10471

[51] Int. Cl.³ .......................................... H04Q 11/04
[52] U.S. Cl. ....................................... 370/56; 370/58; 370/66
[58] Field of Search ...................... 370/56, 58, 65, 66

[56] References Cited

U.S. PATENT DOCUMENTS

| | | | |
|---|---|---|---|
| 3,492,430 | 1/1970 | Vigliante | 370/56 |
| 3,760,103 | 9/1973 | Condon | 370/58 |
| 4,093,827 | 6/1978 | Charransol et al. | 370/66 |

Primary Examiner—Joseph A. Orsino, Jr.
Attorney, Agent, or Firm—Oblon, Fisher, Spivak, McClelland & Maier

[57] ABSTRACT

Concentrator-deconcentrator devices for time-division telephone systems, based on the use of symmetrical time-division arrays arranged in terminal modules comprising subscriber and line connecting units to be served and in central modules which provide the connections between these equipments and the exchange to which the device is connected by ensuring variable concentration and improved security.

The device is intended for PCM time-division telephone systems.

7 Claims, 5 Drawing Figures

CONCENTRATOR-DECONCENTRATOR DEVICES

The present invention relates to the concentrator-deconcentrator device based on the symmetrical time-division arrays for time-division telephone exchanges using the Pulse Code Modulation (PCM) technique. According to a known technique, concentration devices make it possible to connect to an exchange a number of subscribers greater than the total number of inputs to the switching network of this exchange.

It should be recalled that the PCM technique consists in sampling speech signals at a rate of 8 kHz and then in quantizing and encoding the samples in the form of digital signals in which each sample is represented by an 8-bit word.

Time multiplexing allows the transmission of signals from different subscribers via a single PCM digital trunk, this type of multiplexing conventionally providing 24 or 30 telephone channels per trunk (CCITT standard).

The known symmetrical time-division array described in the French patent application No. 76 04 354 enables the samples transmitted by eight incoming time-division trunks to be switched to eight outgoing time-division trunks, in a manner allowing a sample transmitted by one of the incoming trunk channels to be switched to any of the outgoing trunk channels. Internal addressing circuits modify the organisation of the 256 possible space-time paths under the control of an external signal.

Concentrator-deconcentrator devices using symmetrical time-division arrays are known for connecting lines or subscribers to the switching network of an exchange. In one specific embodiment, a symmetrical time-division array both concentrates the digital signals transmitted by n incoming PCM trunks known as subscriber or line trunks to m outgoing PCM trunks known as exchange trunks and conversely switches m incoming exchange PCM trunks to n outgoing subscriber or line PCM trunks, the concentration and deconcentration ratios being equal to n/m where m and $n \leq 8$. Other variants of concentrator-deconcentrator devices comprise several symmetrical time-division arrays and use the same principle of input and output stage connection to the subscriber trunks on the one hand and to the exchange trunks on the other. These various devices possess, however, a fixed concentration ratio, which may constitute a hinderance.

Moreover, a fault occurring in a symmetrical time-division array can result in disabling the concentrator-deconcentrator device of which it forms a part.

The purpose of the invention is to overcome these disadvantages by proposing a concentrator-deconcentrator device whose additional advantage is to be decentralized and modular.

According to one characteristic of the invention, the concentrator-deconcentrator device possesses a centralized part consisting of central modules common to both concentrator and deconcentrator and decentralized parts, one belonging to the concentrator of the device and the other to the deconcentrator these decentralized parts being associated with the terminal modules containing the subscriber and line connecting units. Each of the common central modules comprises symmetrical time-division arrays inserted between the exchange PCM trunks and the subscriber PCM trunks, and each of the terminal modules comprises symmetrical time-division arrays inserted between the subscriber PCM trunks and the subscriber and line connecting units. The purposes and characteristics of the present invention may be more clearly understood from the following description of illustrative embodiments, the said description referring to the appended drawings in which:

Figure 1:
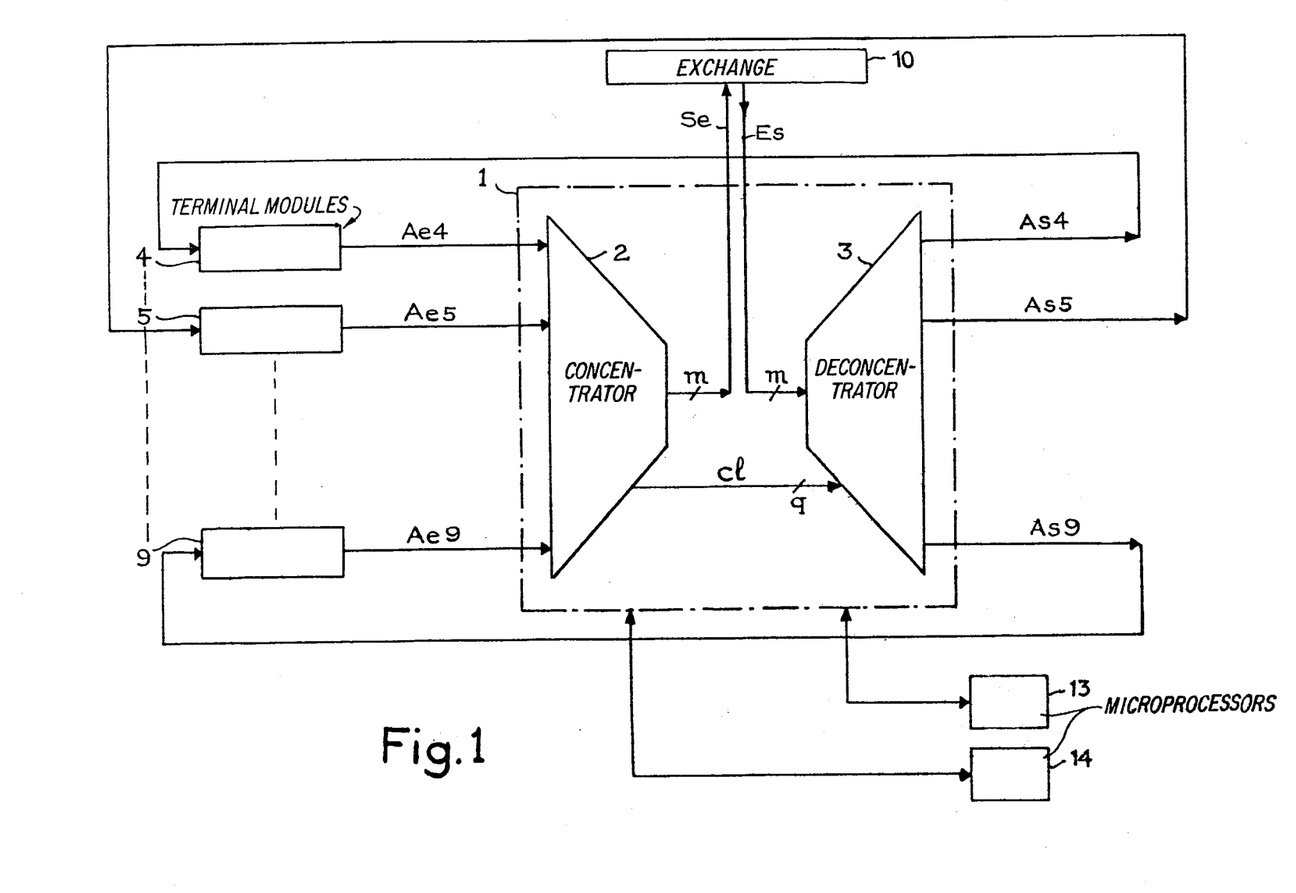
FIG. 1 represents the block diagram of the concentrator-deconcentrator device and its environment.

The concentration device 1 shown in FIG. 1 consists of a concentrator 2 and a deconcentrator 3, and is connected to an exchange 10. The output of concentrator 2 is connected to the input of deconcentrator 3 by means of q local connections Cl. The inputs of concentrator 2 consist of n subscriber PCM trunks Ae from p terminal modules numbered 4 to 9, n preferably being a multiple of p. The p terminal modules constitute a terminal unit. The outputs of concentrator 2 are connected via m exchange PCM trunks Se to the exchange 10, m being less than n.

In a symmetrical manner, the inputs of deconcentrator 3 are connected to the exchange 10 by m exchange PCM trunks designated Es, and the outputs of deconcentrator 3 are connected to the terminal modules by n subscriber PCM trunks As.

In a preferred illustrative embodiment, $n \leq 48$, $p \leq 6$ and $2 \leq m \leq 4$, each terminal module being connected to 8 subscriber trunks Ae and to 8 subscriber trunks As, $2 \leq q \leq 24$ local connections connecting concentrator 1 to deconcentrator 2.

Device 1 and more particularly the symmetrical time-division arrays are conventionally controlled by two microprocessors 13 and 14.

Figure 2:
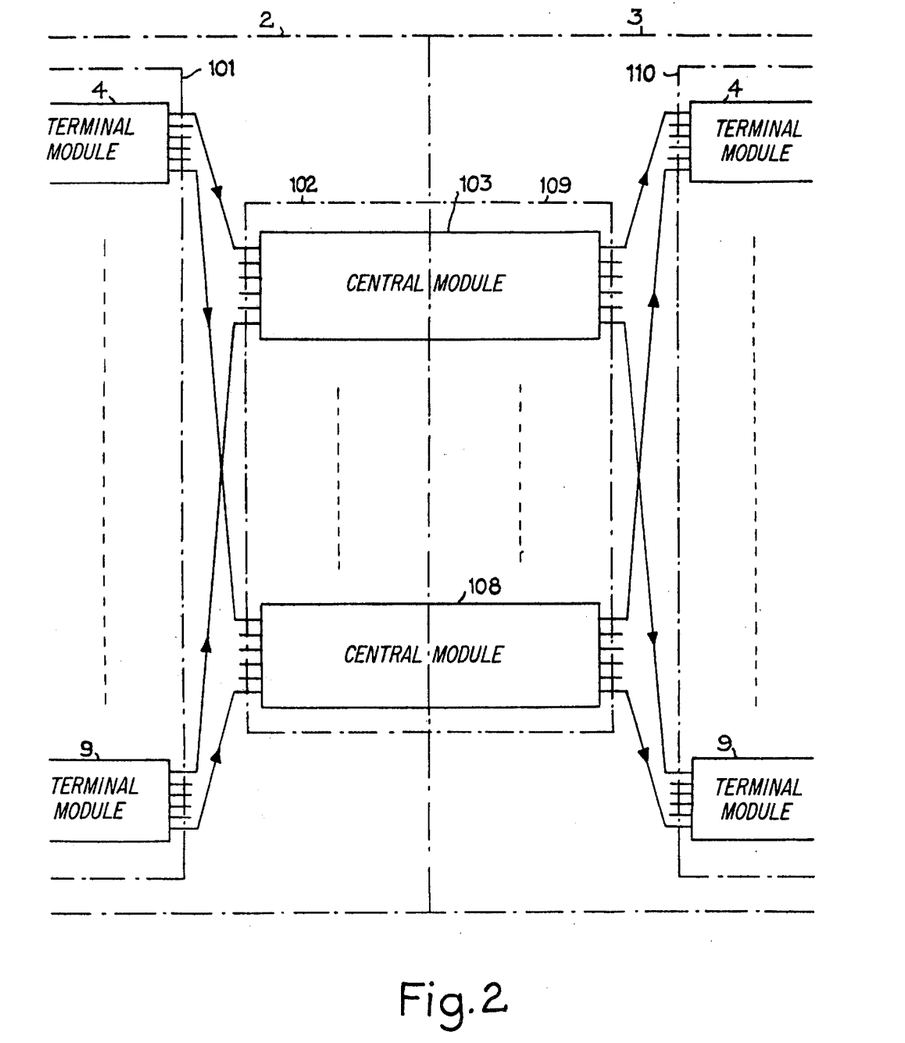
FIG. 2 schematically represents the structure of the concentrator-deconcentrator device.

FIG. 2 schematically illustrates the structure of the concentrator-deconcentrator device 1. In order to simplify the drawing, trunks Se and Es and the local connections Cl inside the concentrator-deconcentrator device 1 are not shown. Concentrator 2 consists of a first decentralized stage 101 consisting of p terminal modules 4 to 9 and a second centralized stage 102 consisting of the concentration path of "r" central modules numbered 103 to 108, the number r of these central modules varying preferably from a minimum of 2 for security reasons to a maximum of 6, depending on the traffic load.

In a symmetrical manner, deconcentrator 3 consists of a first centralized stage 109 performed by the deconcentration part of the r central modules numbered 103 to 108, and a second decentralized stage 110 formed by the p terminal modules 4 to 9.

Figure 3:
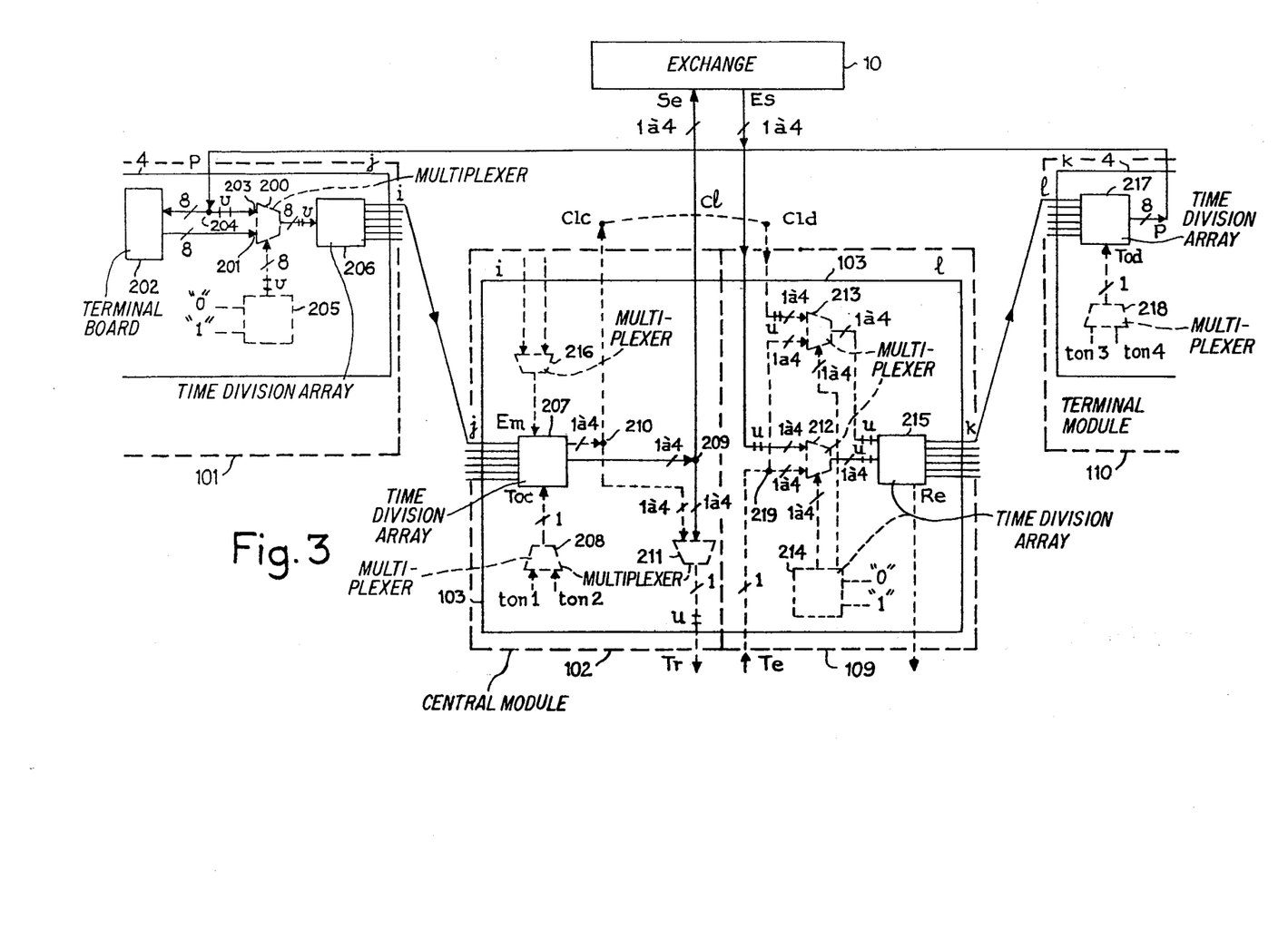
FIG. 3 represents a basic modular part of the concentrator-deconcentrator device.

FIG. 3 shows a basic modular part of the concentrator-deconcentrator 1, i.e. part of the first stage 101 of concentrator 2 and part of the second stage 110 of deconcentrator 3 located, for example, in terminal module 4, as well as a part of the second stage 102 of concentrator 2 and a part of the first stage 109 of deconcentrator 3 located, for example, in the central module 103.

With regard to FIGS. 2 and 3, the first decentralized stage 101 of concentrator 2 comprises in each terminal module, such as terminal module 4, a group of multiplexers 200 consisting, for example, of 8 multiplexers. In order to simplify the drawing of FIG. 3, only one of these multiplexers is shown.

An input 201 of each multiplexer of the group of 5 multiplexers 200 is fed with a PCM trunk from a group of terminal boards 202 comprising all the terminal boards contained in the terminal module 4, it being understood that the subscriber and line connecting units of a module are distributed on these terminal boards and that the total number of connecting units of a module is preferably limited to 256. A second input 203 of each multiplexer of the group of multiplexers 200 is fed with a PCM trunk connected to a connection point of a group of connection points 204.

Each connection point of the group of connection points 204 is connected to 1 inward trunk to the group of terminal boards 202.

In addition, the decentralized stage 101 in each terminal module such as terminal module 4 comprises a first symmetrical time-division array 205 having two inputs, one connected to a "0" and the other connected to a "1". The outgoing trunks of array 205 address the multiplexers of group 200. The outgoing trunks of this group of multiplexers 200 constitute the inputs of a second symmetrical time-division array 206, some of whose outputs constitute the outputs of the first stage 101 of concentrator 2. The other outputs of array 206 are not used.

In a preferred variant, the symmetrical time division arrays are of the type 8×8 and the arrays 206 comprise two unused outputs.

The second centralized stage 102 of concentrator 2 comprises a symmetrical time-division array in each central module, such as array 207 in central module 103. Six inputs of array 207 are connected to the first stage 101 such that output No. i ($1 \leq i \leq 6$) of terminal module No. j ($1 \leq j \leq 6$) constituted by an output of a symmetrical time-division array such as array 206 is connected to input No. j of central module No. i, constituted by an input of a symmetrical time-division array such as array 207.

For security reasons, another input Em of array 207 receives the transmitted signalling via two inputs of multiplexer 216. This signalling is sent to the exchange 10.

A last input Toc of array 207 is fed with tone 1 or tone 2 transmitted by a multiplexer 208 and also to be sent to the exchange 10.

The outputs of array 207 are connected via 1 to 4 PCM trunks Se to the exchange 10 and also to 1 to 4 PCM trunks ClC for establishing local connections Cl. These two groups of trunks are also connected to the inputs of a multiplexer 211. Output Tr of multiplexer 211 is connected to a test device for checking the continuity of a speech path established via the concentrator-deconcentrator device 1.

The first centralized stage 109 of deconcentrator 3 comprises in each central module, such as central module 103, two groups of multiplexers 212 and 213, each consisting of 1 to 4 multiplexers as well as two symmetrical time-division arrays 214 and 215. In order to simplify the diagram of FIG. 3, only one multiplexer of each of the two groups of multiplexers 212 and 213 is shown. Within each of the two groups of multiplexers 212 and 213, each multiplexer is fed with a test trunk Te.

Each multiplexer of the group of multiplexers 212 is also fed with a trunk Es from the exchange 10, and each multiplexer of the group of multiplexers 213 is fed with a trunk Cld itself connected to one of the trunks Clc described above via a local connection trunk Cl.

Array 214 has two inputs, one connected to a "0" and the other connected to a "1". Amongst the 8 outgoing trunks of the symmetrical time-division arrays 214, 1 to 4 trunks address the 1 to 4 multiplexers of group 212 and the 1 to 4 other trunks address the 1 to 4 multiplexers of group 213.

The 1 to 4 outgoing trunks of the 1 to 4 multiplexers of group 212 and the 1 to 4 outgoing trunks of the 1 to 4 multiplexers of group 213 are connected to the inputs of array 215. An output Re of array 215 restitutes the signalling transmitted by the exchange 10 on one of the trunks Es and via a multiplexer of the group of multiplexers 212. The second decentralized stage 110 of deconcentrator 3 comprises in each terminal module, such as terminal module 4, a symmetrical time-division array 217, of which certain inputs (6 in the illustrative embodiment described) are connected to the first stage 109, respecting the principle of connecting the first and second stages 109 and 110 described above: output No. k ($1 \leq k \leq 6$) of central module No. 1 ($1 \leq l \leq 6$), constituted by an output of an array such as 215, is connected to input No. 1 of terminal module No. k, constituted by an input of an array such as 217. Another input Tod of array 217 is fed with tone 3 or tone 4 transmitted by multiplexer 218. Each of the eight outgoing trunks of array 217 is connected to a connection point of the group of connection points 204 located in the first stage 101 of concentrator 2.

The operation of the circuit in accordance with the present invention is described below, referring to FIGS. 1, 2, 3, 4, 5 and 6. In the illustration presented, the concentrator-deconcentrator 1 concentrates 48 subscriber 32-channel PCM trunks Ae onto 2 to 24 exchange 32-channel PCM trunks Se, and conversely switches 2 to 24 exchange PCM trunks Es to 48 subscriber PCM trunks As.

The concentrator-deconcentrator device 1 also performs auxiliary functions such as establishing local communications between two subscribers, one subscriber and a line, or two lines belonging to the same subscriber connecting unit, the generation of tones, the transmission of signalling to and from the exchange 10 as well as testing the continuity of a speech path established through the concentrator-deconcentrator device 1.

In the diagram of FIG. 3, the components involved in performing the main concentration-deconcentration function are shown with the full lines, whilst those involves in auxiliary functions are shown with dotted lines.

The concentration function involves the first and second stages 101 and 102 of concentrator 2. In the part of the first stage 101 located in terminal module 4, the symmetrical time-division array 205 receives from one of the microprocessors 13 and 14 instructions which may or may not order continuity tests of a space-time path established in the concentrator-deconcentrator device 1. When no test is ordered, the value "1" is applied to none of the channels of the 8 outgoing trunks of the array 205. The multiplexers of the group of multiplexers 200 addressed by logical "0's" present on their outputs the states of the 8 trunks from the group 202 of terminal boards in terminal module 4. The symmetrical time-division array 206 concentrates the digital signals received from these 8 trunks over 1 to 6 outgoing trunks, depending on the traffic load. The digital samples transmitted during the time slots TS's available on the incoming trunks of the array 206 are attributed time slots available on the 1 to 6 outgoing trunks in accordance with the instructions received by this array 206.

Each of the outgoing trunks of array 206 is connected to a central module in accordance with the connection principle of stages 101 and 102 defined above.

In the central module 103, array 207 concentrates the samples received over the 6 trunks Ae obtained from the 6 terminal modules, such as terminal module 64, over 1 to 4 trunks Se. The concentration ratio of each central module therefore varies from 3/2 to 6 in the case where the maximum number of subscriber connecting units is installed.

The deconcentration function involves the first and second stages 109 and 110 of deconcentrator 3. In the first stage 109, array 214 receives from one of the microprocessors 13 and 14 instructions which may or may not order a continuity test of a space-time path established in the concentrator-deconcentrator device 1. If no test is ordered, a logical "1" is not transmitted over any of the channels of the 8 outgoing trunks of the symmetrical time-division array 214. The outputs of the multiplexers of the group of multiplexers 212 addressed by logical "0's" present the states of the incoming junctions Es.

Array 215 transfers the states of the outgoing junctions of each of the multiplexers 212 onto the outgoing trunks As. These trunks As are connected to parts of the second stage 110 located in the terminal modules in accordance with the principle of connecting stages 109 and 110 stated above.

In terminal module 4, matrix 217 switches the input trunks Ae from the central modules to the outgoing trunks, each being connected to a connection point of the group of connection points 204 located in stage 101, such that these trunks are connected to the corresponding trunks to the group of terminal boards 202.

Figure 4:
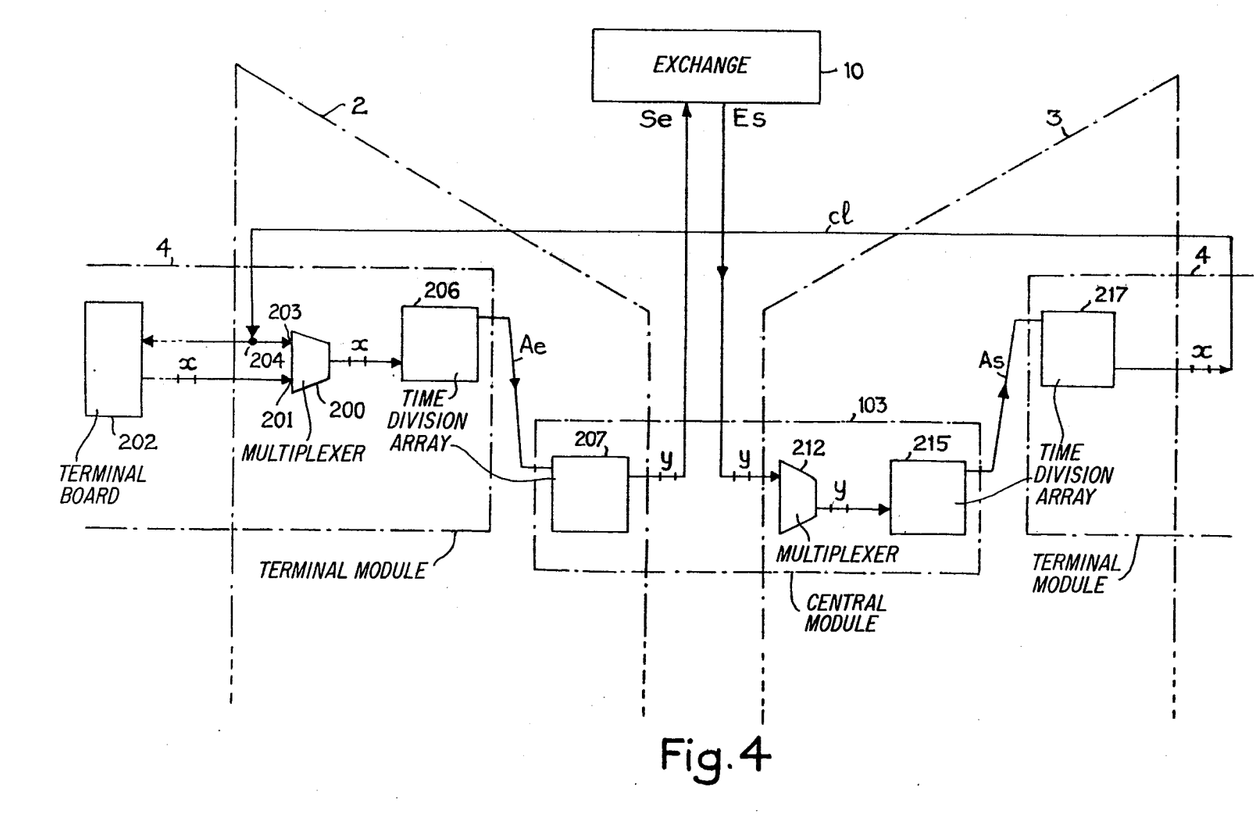
FIG. 4 is a simplified diagram illustrating the symmetry of paths established via the concentrator-deconcentrator device.

As shown by the simplified diagram in FIG. 4, there is symmetry between the space-time paths established via concentrator 2 and deconcentrator 3 in the case of a communication established between two subscribers A and B not belonging to the same subscriber connecting unit. Consider a speech signal from subscriber A obtained from a group of terminal boards, such as group 202 located in terminal module 4, appearing over a channel x on input 201 and then on the output of a multiplexer belonging to the group of multiplexers 200. This channel x is connected to a channel y of trunk Se via arrays 206 and 207.

In a symmetrical manner, returning from the exchange 10, a speech signal sample from subscriber B communicating with subscriber A appears via channel y of trunk Es on the input of deconcentrator 3 and more precisely on the input of the same central module as that used by concentrator 2 for routing the speech signal sample of subscriber A to the exchange 10, this central module in the illustration given being central module 103. This channel y is connected to a channel x via a multiplexer of the group of multiplexers 212 and via the symmetrical time-division arrays 215 and 217. This channel x is itself connected to the corresponding return channel x to the group of terminal boards such as group 202 located in terminal module 4.

Local communications can be established directly without passing through the exchange 10 between two subscribers A and C whose equipments are located in the same subscriber connecting unit. The speech signal sample from a subscriber A whose telephone set is connected to a terminal board of group 202 is sent via a multiplexer of the group of multiplexers 200 and the array 206. This sample carried by trunk Ae No. i from array 206 is fed to the central module No. i. If i=1, for example, and if the terminal module concerned is terminal module 4, the sample appears on the first incoming trunk of array 207 in the central module 103. The instructions received by array 207 order the sample to be applied to one of the four trunks Clc. The selected trunk Clc is connected to a corresponding trunk Cld by a local connection Cl, such that the speech signal sample is fed via a multiplexer of the group of multiplexers 213 to an input of array 215. The instructions received by this array 215, depending in which terminal module is located the terminal board corresponding to subscriber C, determine the trunk As No. k of array 215 over which the sample is to be sent. Since the central module concerned in the illustration considered is module 103, the sample passes from this trunk As No. k to the first incoming trunk of array 217 in the terminal module No. k, i.e. terminal module 4. The speech signal sample thus reaches subscriber C, whose telephone set is connected to the group of terminal boards.

Figure 5:
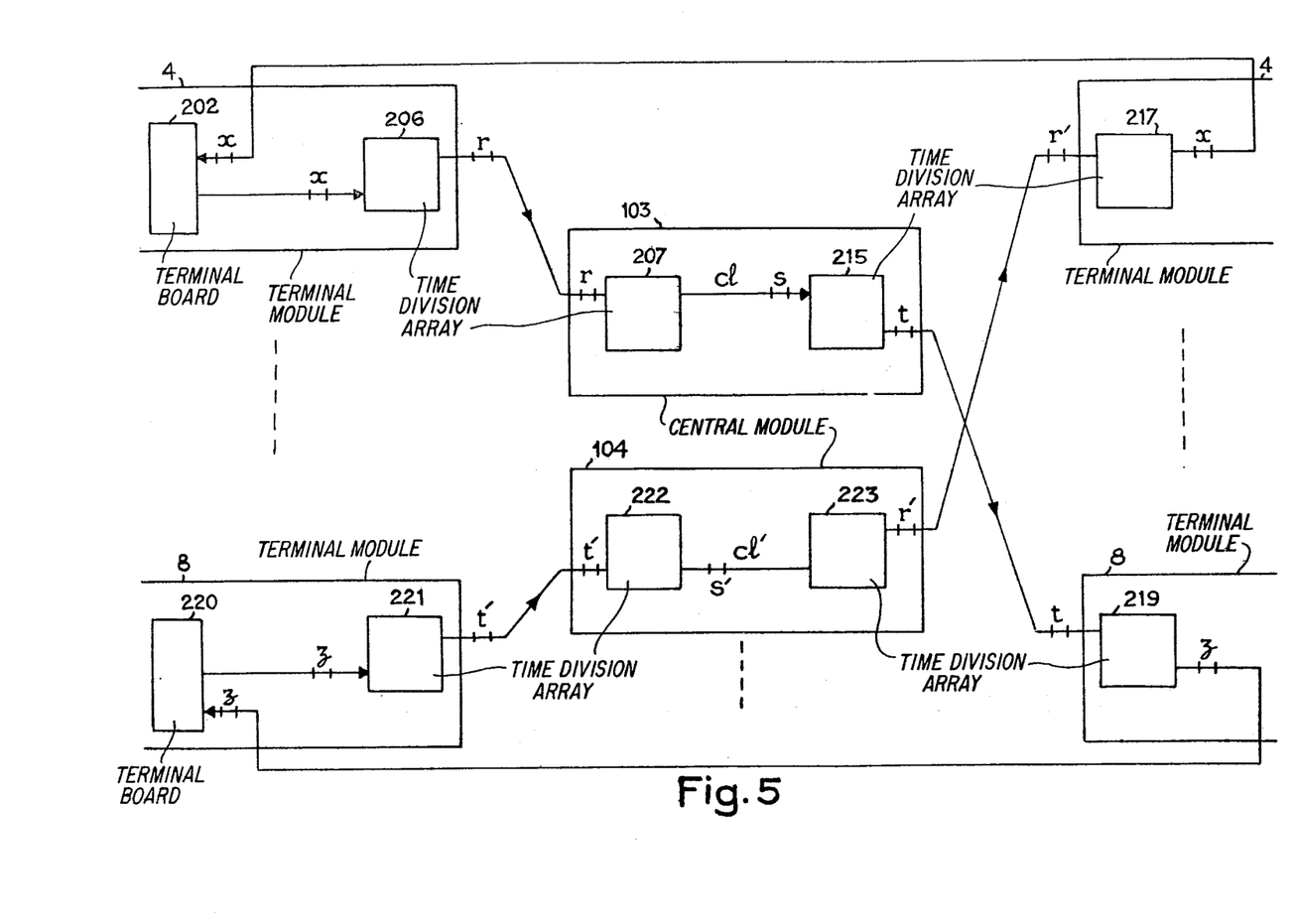
FIG. 5 shows in a simplified manner an example of outward and inward paths established between two locally switched subscribers.

The diagram in FIG. 5 illustrates in a simplified manner an example of outward and inward paths established between subscribers A and C in local communication, the connection from A to C being that previously detailed in FIG. 3. Summarizing, a speech signal sample applied over channel x to the input of array 206 of terminal module 4 is carried by a channel r of the first outgoing trunk of array 206 and then via a channel r of the first incoming trunk of matrix 207 of central module 103. This channel r is connected via array 207 to a channel s of a local trunk Cl and therefore of an incoming trunk of array 215. Assuming that the terminal module No. k in which is located the terminal board belonging to subscriber C is one of the terminal modules 4 to 9 shown in FIG. 2 or terminal module 8 in the case of k=5, the speech signal sample of subscriber A is obtained on a channel t of the fifth outgoing trunk of array 215. Consequently, this sample is also on channel t of the first incoming trunk of a symmetrical time-division array 219 of terminal module 8, the equivalent of array 217 of terminal module 4. The sample appears via array 219 on a channel z of an outgoing trunk of this array 219, a trunk which is connected to a trunk returning to the group of terminal boards 220 comprising the subscriber equipment C.

For the return path, the speech signal sample of subscriber C is applied over channel z to the input of a symmetrical time-division array 221 of terminal module 8. The instructions received by array 221 order the sample to be applied to a channel t' of an outgoing trunk No. i of array 221. If i=2, for example, the sample appears on a channel t' of the 21st outgoing trunk of array 221 and then on channel t' of the 5th incoming trunk of a symmetrical time-division array 222 of central module 104. This channel t' is connected via array 222 to a channel s' of a local trunk Cl' and therefore of an incoming trunk of a symmetrical time-division array 223.

The speech signal sample of subscriber C is obtained on a channel r' of the first outgoing trunk of array 223 and consequently on a channel r' of the second incoming trunk of array 217 of terminal module 4. The sample appears on channel x of an outgoing trunk of array 217, a trunk which is connected to a trunk returning to the group of terminal boards 202 comprising the equipment of subscriber A.

The outward and inward paths between the equipments of subscribers A and C have been described in a general case with regard to the channels on which the speech signal samples of subscribers A and C appear in turn.

It should be noted that for simplification purposes, when the central modules selected for the outward and inward paths are the same, the paths established via the concentrator-deconcentrator device 1 are such that t=t' and r=r'.

The concentrator-deconcentrator device 1 also sends tones to the group of terminal boards such as group 202 located in terminal module 4 and also to the exchange 10. In the first of these cases, the tones should be sent without blocking. For this reason, these tones are sent from the second stage 110 of deconcentrator 3. Referring to FIG. 3, one of the tones 3 and 4 on the input of multiplexer 218 is thus fed via multiplexer 218 to the incoming trunk Tod and then to the trunk As No. p of array 217. Since this $p^{th}$ trunk As is connected to a connection point of the group of connection points 204 located in the last stage 101 of concentrator 2, tone 3 or 4 is fed to the $p^{th}$ subscriber trunk returning to the group of terminal boards 202.

In a variant of the concentrator-deconcentrator device 1, tones 3 and 4 are applied directly to the two remaining available inputs of array 217. Multiplexer 218 is then eliminated.

The tones are sent to the exchange 10 via the second stage 102 of concentrator 2. In central module 103, one of the tones 1 and 2 applied to the input of multiplexer 208 is thus applied by this multiplexer 208 to the incoming trunk Toc and then to one of the four trunks Se of array 207.

Referring to FIGS. 2 and 3, the signalling to the exchange 10 is applied for security reasons to two inputs of multiplexers, such as multiplexer 216 located in the second stage 102 of concentrator 2. This signalling is then applied to inputs Em of arrays such as 207 and then to previously determined trunks Se.

The signalling returned by the exchange 10 on previously determined trunks Es is fed via multiplexers of groups of multiplexers, such as group 212, to the arrays such as 215. This signalling appears on the outputs Re of arrays such as 215.

The principle of speech continuity test is described with reference to FIGS. 1, 2 and 3. A path corresponding to a non-local communication may have been established between a subscriber A, whose telephone set is connected to a terminal board of a group such as, for example, group 202 located in terminal module 4, and a subscriber B whose telephone set is not connected to a concentrator-deconcentrator device 1, or a path corresponding to a local communication may have been established between subscriber A and a subscriber C whose telephone set is connected to a terminal board of a group, such as group 202 located in one of the terminal modules 4 to 9.

In both cases, a path continuity test consists in checking the continuity of the path established via the concentrator-deconcentrator device 1 between the two subscribers A and B or A and C, without modifying the operation of said concentrator-deconcentrator device 1.

In the first stage 109 of deconcentrator 3 in the deconcentration part of central module 103, for example, the effect of the orders received by array 214 when a test is ordered for a channel u of an incoming trunk Es or Cl of a multiplexer belonging to one of groups 212 and 213, is the presence of a logical "1" on a channel u of one of the eight outgoing trunks of array 214, a trunk addressing the multiplexer to be tested of one of the groups 212 and 213.

A test code applied to wire Te and appearing from the connection point 219 on an incoming trunk of each of the multiplexers of groups 212 and 213 is thus obtaned on channel u of the outgoing trunk of the multiplexer to be tested.

On the other hand, the other channels of the outgoing trunks of array 214 show a logical "0" and the speech signal samples carried by the channels which are not to be tested of the incoming trunks Es or Cl of the multiplexers of groups 212 and 213 are obtained on the outgoing trunks of these multiplexers which are not to be tested.

The test code applied to channel u of an incoming trunk of array 215 is switched to an outgoing trunk of array 215. In the case of a path established between subscribers A and B, the test code is applied to an incoming trunk of array 217. In the case of a path established between subscribers A and C, the test code is applied to the incoming trunk of an array, such as 217, located in one of the terminal modules 4 to 9 corresponding to subscriber C. The code is then applied to a $p^{th}$ outgoing trunk As of deconcentrator 3.

In the part of the first stage 101 of concentration 2 located either in terminal module 4 in the case of a path established between subscriber A and B or in one of the terminal modules 4 to 9 in the case of a path established between subscribers A and C, array 205 or an equivalent array, depending on the instructions received, applies a logical "1" to channel v of the $p^{th}$ outgoing trunk, and logical "0's" to the other channels of the outgoing trunks.

Considering for example terminal module 4, input 203 of one of the multiplexers of the group of multiplexers 200, addressed over the $p^{th}$ outgoing trunk of array 205, is then enabled only for channel v, which is again obtained on the output of the decentralized part of concentrator 2.

The test code applied to channel v of the $p^{th}$ outgoing trunk of an array such as 217 is therefore applied to channel v of the junction corresponding to input 203 of the $p^{th}$ multiplexer of the group of multiplexers 200. This code is then applied to channel v of the $p^{th}$ incoming trunk and to an $i^{th}$ outgoing trunk of array 206 and then, in the illustration considered, to an incoming trunk of array 207 of central module 103, this for the already explained reasons of symmetry of paths established in the concentration-deconcentrator device 1.

The code on the output of array 207 is applied via the connection points 209 (in the case of a path established between subscribers A and B) or 210 (in the case of a path established between subscribers A and C) to a channel u of an incoming trunk of multiplexer 211. Since the outgoing trunk of this multiplexer 211 is connected to trunk Tr, the test code is obtained on channel u of this trunk as a result of the symmetry of the path established if the path through the concentrator-deconcentrator device 1 has been correctly established.

By design, a concentration device cannot operate without a certain danger of blocking. This danger is evaluated in concentrator 2, for example, from a blocking factor B, itself calculated as a function of the number nl of outgoing TS's (nl=32 no, no representing the number of outgoing trunks) and the total incoming traffic $a = m1\alpha$, ml being the number of incoming TS's (ml = 32 mo, mo representing the number of incoming trunks) and $\alpha$ the traffic load per input, assumed to be constant from one input to another of concentrator 2.

$$B(n1, 1) = \frac{A^{n1}/n1!}{\sum_{i=0}^{i=n1} A^i/i!}$$

The exploitation and operating standards established by the French telecommunications authority imposes a nominal blocking factor of less than $5 \times 10^{-3}$ and a blocking factor in an overload condition (i.e. with an additional traffic load of 20%) less than $10^{-2}$. Since this last factor is the more severe, the results of the following table have been calculated in order to obtain:
$B(n1, A_{overload})$ less than $10^{-2}$.

| no | mo/no | $A_{overload}$ (in Erlangs) | $A_{nominal}$ (in Erlangs) | $\alpha_{nominal}$ |
|----|-------|-----------|-----------|---------|
| 2  | 24    | 50        | 42        | 0.028   |
| 3  | 16    | 80        | 67        | 0.043   |
| 4  | 12    | 110       | 92        | 0.060   |
| 5  | 9.6   | 140       | 117       | 0.075   |
| 6  | 8     | 173       | 144       | 0.095   |
| 8  | 6     | 230       | 192       | 0.125   |
| 10 | 4.8   | 297       | 248       | 0.160   |
| 12 | 4     | 359       | 299       | 0.195   |
| 14 | 3.4   | 423       | 353       | 0.230   |
| 16 | 3     | 486       | 405       | 0.265   |
| 18 | 2.6   | 550       | 458       | 0.30    |
| 20 | 2.4   | 613       | 511       | 0.33    |
| 24 | 2     | 740       | 617       | 0.40    |

Said table indicates, as a function of the number no of outgoing trunks, the concentration ratio (mo/no), mo being fixed at 48, the maximum number of incoming trunks in concentrator 2, the overload blocking factor $A_{overload}$, the nominal blocking factor $A_{nominal}$, and the nominal traffic per input $\alpha_{nominal} = A_{nominal}/(32 \times 48)$.

What is claimed is:

1. A concentrator-deconcentrator device for association with a time-division telephone exchange and for establishing space-time paths between subscriber PCM trunks connected to a group of subscriber and line connecting units and exchange PCM trunks connected to the exchange, comprising:
   a concentrator including a first decentralized part having an output section and a first centralized part;
   a deconcentrator including a second decentralized and a second centralized part;
   wherein said first centralized part and said second centralized part make up a centralized unit having an input section and outputs, said centralized unit being comprised of a plurality of central modules;
   wherein each of said central modules includes symmetrical time-division arrays inserted between the exchange PCM trunks and the subscriber PCM trunks;
   wherein said first decentralized part and said second decentralized part make up a decentralized unit, said decentralized unit being composed of a plurality of terminal modules;
   wherein each of said terminal modules include symmetrical time-division arrays inserted between the subscriber PCM trunks and the subscriber and line connecting unit;
   wherein each of said plurality of central modules is connected to each of said plurality of terminal modules; and
   wherein said first centralized part of said concentrator is connected to said second centralized part of said deconcentrator by means of the exchange PCM trunks wherein each central module comprises a third symmetrical time-division array connected by at least one input to the output of a first symmetrical time-division array and by at least one output to exchange and local connection PCM trunks, and a fourth symmetrical time-division array connected by at least one input to exchange PCM trunks via a second group of multiplexers and to local connection PCM trunks via a third group of multiplexers whose outputs are connected to the inputs of the second symmetrical time-division arrays.

2. A concentrator-deconcentrator device in accordance with claim 1, wherein each terminal module comprises said first symmetrical time-division array whose inputs are connected by a first group of multiplexers to the subscriber and line connecting units of the terminal module via PCM trunks, and having at least two outputs connected to said input section of the centralized unit, and said second symmetrical time-division array having two inputs connected to the outputs of the centralized unit and having outputs connected to the subscriber and line connecting equipments via PCM trunks.

3. A concentrator-deconcentrator device in accordance with claim 1, wherein the outgoing local connection PCM trunks of the third symmetrical time-division array are connected one by one to the local connection PCM trunks of the fourth symmetrical time-division array.

4. A concentrator-deconcentrator device in accordance with claims 2 or 1, wherein said output section of the first decentralized part of each terminal module are individually connected each to one input of said input section of the centralized unit via PCM trunks and wherein the input of the second decentralized part of each terminal module are individually connected each to an output of the centralized unit via other PCM trunks.

5. A concentrator-deconcentrator device in accordance with claim 1, wherein each second symmetrical time-division array comprises at least one tone input to be sent to the subscriber equipments of the terminal module of which this array forms a part, and wherein each third array comprises a tone input for sending to the exchange to which the device is connected.

6. A concentrator-deconcentrator device in accordance with claim 1, wherein each third symmetrical time-division array comprises a signalling input to be sent to the exchange to which the device is connected, and wherein each fourth symmetrical time-division array comprises an output for signalling from this exchange.

7. A concentrator-deconcentrator device in accordance with claims 2 or 1, comprising a device for testing paths having test PCM trunks established, including in each central module a fifth symmetrical time-division array connected by two inputs to complementary logic levels and by at least one output to the addressing inputs of the second and third groups of multiplexers, which comprise inputs connected to the test PCM trunks, and comprising in each terminal module a sixth symmetrical time-division array, connected by two inputs to complementary logic levels and by at least one output to the addressing inputs of the first group of multiplexers, which comprises inputs connected to second outgoing PCM trunks of the second symmetrical time-division array.

* * * * *